United States Patent

Coutts

[11] Patent Number: 6,149,949
[45] Date of Patent: *Nov. 21, 2000

[54] PASTEURIZATION AND FERMENTATION OF A FERMENTABLE EXTRACT

[75] Inventor: Morton William Coutts, Auckland, New Zealand

[73] Assignee: Morton Coutts Limited, Auckland, New Zealand

[*] Notice: This patent issued on a continued prosecution application filed under 37 CFR 1.53(d), and is subject to the twenty year patent term provisions of 35 U.S.C. 154(a)(2).

[21] Appl. No.: 08/817,623
[22] PCT Filed: Oct. 26, 1995
[86] PCT No.: PCT/NZ95/00109
  § 371 Date: Apr. 24, 1997
  § 102(e) Date: Apr. 24, 1997
[87] PCT Pub. No.: WO96/13572
  PCT Pub. Date: May 9, 1996

[30] Foreign Application Priority Data

Oct. 31, 1994 [NZ] New Zealand ............................ 264825
Nov. 10, 1994 [NZ] New Zealand ............................ 264899
Mar. 9, 1995 [NZ] New Zealand ............................ 270670

[51] Int. Cl.[7] .............................. C12C 11/07; C12C 11/09
[52] U.S. Cl. ................................... 426/16; 426/29; 426/30
[58] Field of Search ................................ 426/16, 29, 30, 426/592

[56] References Cited

U.S. PATENT DOCUMENTS 4,495,204  1/1985  Weaver et al. ............................. 426/16
4,840,802  6/1989  Lindberg et al. .
5,762,991  6/1998  Dziodziak et al. ......................... 426/11
6,077,549  6/2000  Bodmer et al. ............................. 426/16

FOREIGN PATENT DOCUMENTS 6887094  2/1995  Australia .
94/16054  7/1994  WIPO .

*Primary Examiner*—Curtis E. Sherrer
*Attorney, Agent, or Firm*—Ladas & Parry

[57] ABSTRACT

This invention relates to a method for pasteurization and fermentation in the production of an alcoholic beverage. The method involves taking a fermentable soluble extract from a processed brewer's mash, mixing it in a mixing zone with a fermented fermentable extract containing an alcohol content of at least 4% alcohol by volume together with other products formed during fermentation, processing this mixture by heating the mixture to a temperature of at least 51° C. (124° F.) holding the mixture at that temperature for ten to twenty minutes and then cooling the mixture to a minimum of 10° C. (50° F.) before fermenting the mixture according to known fermentation processes. In order to produce a continuous flow process and better control the specific gravity of the unfermented fermentable extract, the liquid extract from the brewer's mash may be converted to a soluble powder product which can then be provided in a continuous flow of powder product for dissolving with a continuous flow of water to produce a continuous flow of fermentable soluble extract for mixing with a continuous flow of fermented fermentable extract taken from an outlet of a continuous fermenting plant, the mixture being processed as above before entering the continuous fermenting plant for fermentation to produce an alcoholic beverage.

22 Claims, 1 Drawing Sheet

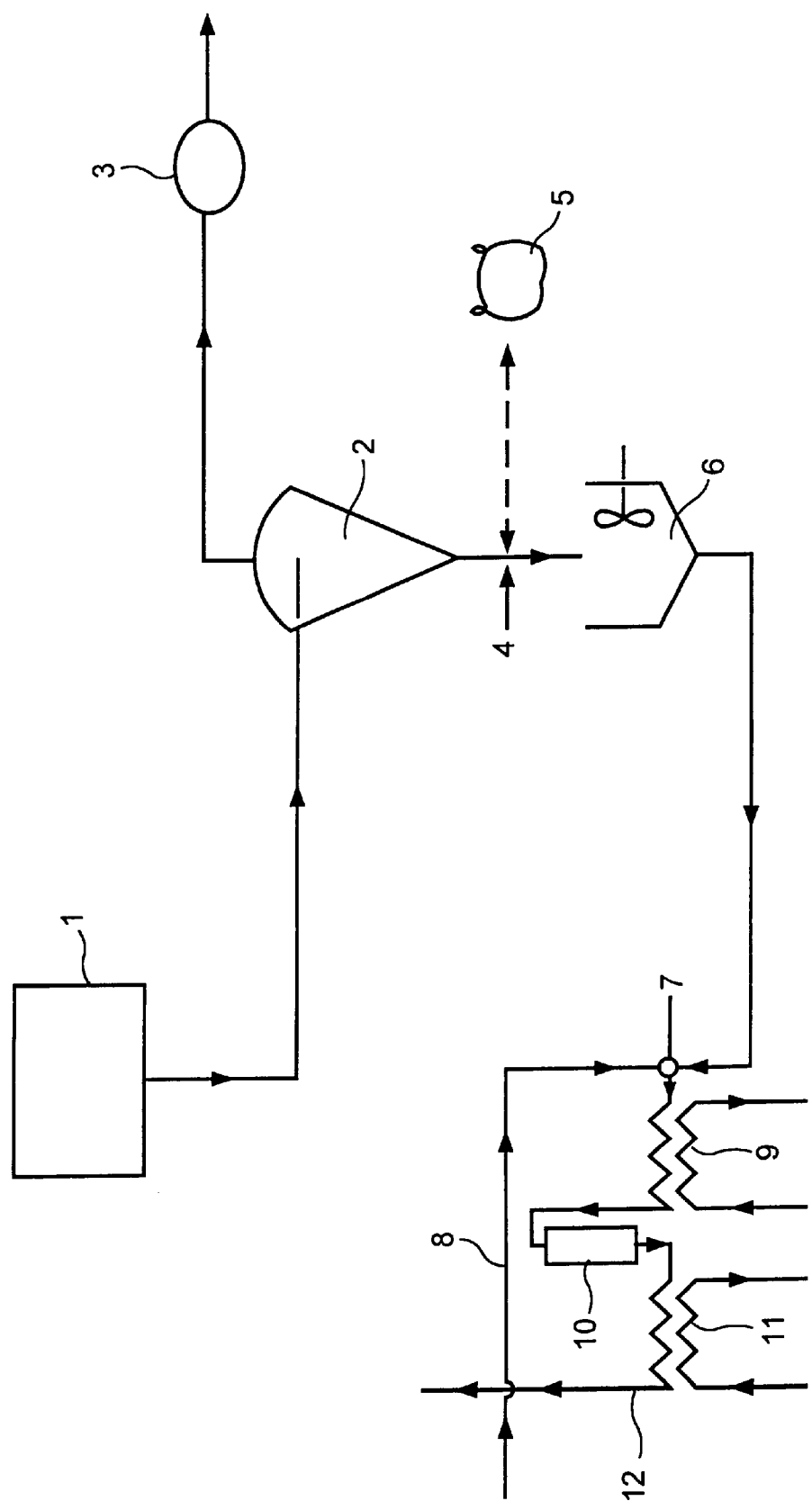

6,149,949

PASTEURIZATION AND FERMENTATION OF A FERMENTABLE EXTRACT

TECHNICAL FIELD

This invention relates to a method for pasteurisation and fermentation of yeast fermentable extracts in the production of an alcoholic beverage and products produced thereby, and more particularly, but not exclusively, to a low temperature method for pasteurising fermentable extracts.

BACKGROUND ART

These techniques which achieve pasteurisation at lower temperatures also provide for improvements in maturation processes during pasteurisation of fermentable extracts.

In the traditional method used in many breweries the liquid extract from the mashing process is boiled at about 103° C. (218° F.) after which the liquid extract is clarified, cooled and fermented after addition of brewers yeast. The fermentation occurs at about 13° C. (55° F.). Under these conditions an alcohol level of about 6% by volume is achieved by fermentation.

Brewing literature reveals that during and after the traditional process of boiling at about 103° C. (218° F.), the processes of coagulation and adsorption of nutrients on the coagulant are responsible for the removal from the germinated grain extract of many of the important nutrients required by yeast for fermentation and propagation.

With a view to preventing the loss of yeast nutrients resulting from the boiling process, a further known process has been developed which allows for the processing of the germinated grain at temperatures below 82° C. (180° F.) after which the liquid extract from the processed grain is cooled to about 13° C. (55° F.) and is fermented with brewer's yeast. Under these conditions where the liquid extract from the processed germinated grain is not boiled but is cooled directly to fermentation with brewer's yeast an alcohol content of about 9% by volume will result. This method is described in New Zealand patent specification no. 248338 248503/248973/250413/250975, and the processes described in that specification for preparing a soluble extract including yeast nutrients are as follows. Disclosed is a method of manufacturing an alcoholic beverage comprising the steps of:

(i) taking the soluble extract including yeast nutrients in a liquid form from processed moisture infused germinated grain where the processing temperature(s) (including any temperature of any of those temperatures used to activate the various germinated grain enzymes) is or are kept below 180° F. to prevent said yeast nutrients being entrapped in coagulate such as that which would be produced were the processed moisture infused germinated grain to be boiled at atmospheric pressure;

(ii) heating the said liquid extract to enhance enzyme activity therein but to a temperature below that where coagulates are formed which would cause yeast nutrient material to be entrapped in coagulate such as that which would be produced were the liquid extract to be boiled at atmospheric pressure;

(iii) cooling the liquid extract of step (ii) to between about 50° F. and about 60° F. and fermenting the cooled liquid extract with oxygenated brewers yeast in the presence of an added fermented extract which has been prepared according to said steps (i), (ii), and (iii) so that the mixture begins fermenting with an alcohol content of about 3% by volume or higher and other products of fermentation to provide said alcoholic beverage.

The prior art, although extensive, does not disclose a method for achieving pasteurisation of fermentable extracts at temperatures below 71° C. (160° F.). Carrying out pasteurisation at temperatures below 71° C. (160° F.) would be advantageous in order to avoid the coagulation which occurs above 71° C. (160° F.) and which results in loss by adsorption of important nutrients required by yeast for fermentation.

It will be appreciated by persons skilled in the art that the term soluble extract, when taken from a brewer's mash, and as used in this specification, refers to an extract containing both fermentable material and yeast nutrients used in part for propagation.

It is therefore an object of the present invention to provide a method whereby pasteurisation of a fermentable extract from a germinated grain brewers mash can be achieved at temperatures below 71° C. (160° F.) and so avoid yeast nutrient loss.

Other objects of this invention will become apparent from the following description.

DISCLOSURE OF INVENTION

According to one aspect of the present invention there is provided a method for manufacturing an alcoholic beverage comprising the steps of:

taking a fermentable soluble extract in liquid form from a brewers mash which has been processed according to any known method;

mixing said fermentable soluble extract with a fermented fermentable extract which before fermentation was similar to the fermentable soluble extract, to produce a mixture;

processing said mixture by heating said mixture to at least 51° C. (124° F.) in a heating zone, holding said mixture for at least 10 minutes in a holding zone and then cooling said mixture in a cooling zone to a fermenting temperature of between 10° C. (50° F.) and 15° C. (59° F.), all in a continuous flow; and fermenting said processed mixture with oxygenated brewers yeast to produce said alcoholic beverage.

In a preferred form of the invention the method may further comprise the steps, prior to mixing, of:

evaporating said fermentable soluble extract in liquid form within a vacuum vessel together with a spray dryer to evaporate the liquid to produce a fermentable soluble extract in powder form;

dissolving said fermentable soluble extract in powder form with water to produce a dissolved powder product which constitutes the fermentable soluble extract for mixing with the fermented fermentable extract.

Preferably, the temperature of the fermentable soluble extract in liquid form during its evaporation to a powder form is kept below 71° C. (160° F.). Further, preferably, the temperature during the dissolving step may also be kept below 71° C. (160° F.).

In a further preferred form of the invention the dissolved powder product, prior to mixing, may have a specific gravity below 1.150.

In a further preferred form of the present invention the fermented fermentable extract may contain at least 4% alcohol by volume together with other products formed during fermentation. Further, this extract may be mixed with the fermentable soluble extract in a ratio of substantially 1 to 1.

In a further preferred form of the invention the mixture, prior to processing, may have an alcohol content of up to 5% of alcohol by volume together with other products formed during the fermentation of the added fermented fermentable extract.

Preferably, during processing, the mixture may be heated to a temperature of up to 60° C. (140° F.), and held in the holding zone at this temperature for up to 20 minutes.

Preferably, said temperature and holding time of said processing step may be dependent on the degree and type of infecting organisms in the mixture.

According to a further aspect of the present invention there is provided a method for manufacturing an alcoholic beverage in a continuous flow comprising the steps of:

taking a fermentable soluble extract in liquid form from a brewers mash which has been processed according to a method during which the temperature has been retained below 82° C. (180° F.);

evaporating said fermentable soluble extract in liquid form within a vacuum vessel together with a spray dryer to evaporate the liquid to produce a fermentable soluble extract as a powder product;

storing said powder product until required or transferring it to another location, and holding said powder product in a holding means adapted to provide a continuous controlled flow of said powder product;

dissolving said continuous controlled flow of powder product with a continuous controlled flow of water in such proportions as to maintain a continuous flow of dissolved powder product at a selected specific gravity;

mixing the continuous flow of dissolved powder product with a continuous flow of fermented fermentable extract taken from an outlet of a continuous fermenting plant in a volume ratio of substantially 1 to 1, to produce a mixture;

processing said mixture by heating the mixture to between 51° C. (124° F.) and 60° C. (140° F.), according to the degree and type of infecting organisms in the mixture, holding the heated mixture in a holding zone for up to 20 minutes, then cooling the mixture to a yeast fermenting temperature of substantially 15° C. (59° F.) and returning it to an inlet of said continuous fermenting plant; and, fermenting said processed mixture, in accordance with known continuous fermenting methods, in a continuous fermenting plant to produce the alcoholic beverage.

Other aspects of the present invention may become apparent from the following description and with reference to the accompanying drawing.

BRIEF DESCRIPTION OF DRAWING

FIG. 1: Shows a schematic flow diagram of the production of the vacuum-dried soluble powder form of the fermentable extract, the dissolving of the soluble powdered form of fermentable extract, the mixing of the fermented and unfermented liquid extracts, the pasteurisation process and subsequent fermentation process.

MODES FOR CARRYING OUT THE INVENTION

In the preferred embodiment of the invention represented diagrammatically in FIG. 1 the fermentable liquid extract from the mash (1) is fed to a high vacuum vessel (2) being maintained under high vacuum by a vacuum pump (3).

Instant vaporisation of the liquid in the fermentable liquid extract and the removal of volatile material occurs in the high vacuum vessel (2) to provide a soluble powdered form of the extract (4). Such instant vaporisation may be carried out by spray drying under vacuum at controlled temperature. In a preferred method of the invention this temperature does not exceed 71° C. (160° F.). The soluble powdered form of the extract may be packed in sanitary bags (5) for storage and transportation to distant fermenting plants or alternatively the powdered form may be used directly to provide a fermentable extract.

The dissolving of the soluble powdered form of the liquid extract from the mash is represented as occurring in a mixing vessel (6) the optimum temperature for dissolving of the powdered form of the fermentable extract being 71° C. (160° F.) using brew water as the solvent.

The liquid solution of the soluble powdered form of fermentable extract being the unfermented fermentable extract is passed from mixing vessel (6) to a control mixing zone (7) where the unfermented fermentable liquid extract is mixed with fermenter fermentable extract in a preferred ratio of 1 to 1 by volume. The fermented fermentable extract is supplier to the mixing zone (7) by means of supply line (8) said supply line (8) being connected to fermenting tanks as the source of the fermented fermentable extract.

The combined unfermented fermentable extract and the fermented fermentable extract is then passed to the bulk liquor pasteurising equipment consisting of heat exchanges linked in series with a hold up zone or retention means between the heat exchanges. The mixture of the unfermented fermentable extract and the fermented fermentable extract is passed through the heat exchanger (9) wherein the temperature of the mixture is raised to between 51° C. (125° F.) and 60° C. (140° F.). The time for pasteurisation of the mixture, being the time for holding the mixture at up to 60° C. (140° F.) in the hold up zone or retention means, is determined by adjustment of the volume size of the liquid in the hold up zone or retention means (10).

In the present embodiment the required time for the said mixture to be held in the hold up zone or retention means at between 51° C. (125° F.) and 60° C. (140° F.) in order to achieve pasteurisation is about 20 minutes. This depends on the growing and harvesting conditions of the area where the grain was produced and the degree and type of infecting organisms present.

The combined unfermented fermentable extract and the fermented fermentable extract are passed from the hold up zone or retention means (10) through the second heat exchanger (11) being a cooler, said cooler adjusting the temperature of the mixture to about 13° C. (55° F.). The mixture at about 13° C. (55° F.) is passed by way of conducting means (12) through the fermentation tanks where fermentation occurs after addition of oxygenated yeast cells at about 13° C. (55° F.)

The operation of the pasteurisation system whereby unfermented fermentable extract and fermented fermentable extract are mixed, heated to up to 60° C. (140° F.), held at up to 60° C. (140° F.) for up to 20 minutes, cooled to about 13° C. (55° F.) and transferred to fermenting tanks can be regulated to give optimum conditions of pasteurisation by varying the temperatures and the hold up time of the mixture through the heat exchangers and hold up zone and by varying the volume ratio of unfermented fermentable extract and fermented fermentable extract in the mixing zone (7).

To achieve the benefits of the method of the present invention it is necessary that the mixture of unfermented fermentable extract and fermented fermentable extract before heating contains at least 2% alcohol by volume together with other products formed during fermentation.

In order to obtain a final concentration of alcohol in the fermented extract of substantially 9% by volume, which is a target concentration in a preferred embodiment of the present invention, it is required that the unfermented fermentable extract before mixing with the fermented extract has a specific gravity of over 1.075 sg. A specific gravity of over 1.075 sg for the unfermented fermentable extract can be readily obtained when a liquid solution is prepared of the soluble dry powder form of a processed germinated grain mash extract.

The level of alcohol and other products of fermentation in the mixture before heating provides for the attaining of lower temperatures of pasteurisation.

Where a liquid extract obtained directly from a germinated grain mashing process is used in place of a liquid solution of the dried soluble powder of an unfermented fermentable extract a known liquid extract recycling method should be used in order to obtain a specific gravity of over 1.075 sg in the unfermented fermentable extract prior to mixing with the fermented fermentable extract.

Although in the preferred embodiment the dissolved extract of the soluble powdered form of the unfermented fermentable extract is used for mixing with the fermented fermentable extract, other unfermented fermentable extracts could be used directly in the mixing process. For example, the use of fermentable extract from the mashing process of germinated grain where the liquid extract is taken to a brewers wort boiler and boiled with hops and other additives then clarified and cooled to about 55° C. (131° F.) before mixing of the unfermented wart with a flow of similar wort which has been fermented with brewers yeast. Or alternatively, the use of the liquid extract from the mashing process without boiling.

The present embodiment of the invention which uses the liquid solution of the soluble powdered form of the unfermented fermentable extract of germinated grain provides a significant advantage over the use of other unfermented fermentable extracts. Unfermented fermentable extract in powdered form can be added in a measured continuous flow to a continuous process. It can be stacked and supplied in sanitary bags or in a bulk form, thereby providing a relatively low volume concentrated product in comparison with the bulky kilned germinated grain now used in breweries. Furthermore, the vacuum drying of the unfermented fermentable extract to a powder can be carried out under conditions which will allow for the production of a uniform product and a product characteristic of a particular mashing or extraction process. In this way particular characteristics of flavour or qualities requisite for a particular brewery or a particular fermentation plant can be achieved.

The ability to adjust the specific gravity of the extract to over 1.075 sg insures that high levels of alcohol are obtained in the fermented fermentable extract. In turn the presence of high levels of alcohol and other products of fermentation allows for lower temperatures of pasteurisation to be achieved during the pasteurisation process. Also the presence of the fermented fermentable extract at the elevated temperatures in the hold up zone or retention means during the process of pasteurisation provides for rapid maturing changes to occur in precursory compounds in the mixture of unfermented fermentable extract and fermented fermentable extract. This is the removal of so called "new flavours" in beer by the conversion of precursors to diacetyl.

It will be appreciated that the low temperature pasteurisation process involves the use of plate heat exchangers to provide heating and cooling of the mixture of unfermented fermentable extract and fermented fermentable extract with a hold up zone between the heating and cooling sections to allow time for the pasteurisation process and the flavour precursor changes to occur. The heating section of the pasteurisation system provides that the temperature of the mixture of unfermented fermentable extract and fermented fermentable extract be adjusted to between 51° C. (12520 F.) and 60° C. (140° F.). Changing the volume of the liquid in the hold up zone or retention means of the pasteurisation system will provide for the mixture to be held at between 51° C. (125° F.) and 60° C. (140° F.) for up to 20 minutes and the cooling section will have a capacity to cool the mixture to between 10° C. and 15° C., and preferably about 13° C. (55° F.), being the temperature required for fermentation. The mixture is kept under pressure during its flow through the plate heat exchangers and the hold up zone to prevent evaporation of alcohol.

An example of the manufacture of an alcoholic beverage employing the method of the present invention is presented in Example 1, below.

EXAMPLE 1

A soluble extract in liquid form is taken from a brewers mash which has been processed at temperatures no greater than 71° C. (160° F.) to preserve yeast nutrients. The liquid soluble extract is transferred to an evaporation unit, comprising a vacuum vessel and a spray dryer, where the liquid is converted to a powder form of soluble extract. Again the temperature during evaporation is maintained at or below 71° C. (160° F.)

The powdered soluble extract is transferred to a cone bottom storage silo to permit a continuous controlled flow of the powder to be dissolved with a continuous controlled flow of brew water in such proportions that the required rate of flow of dissolved powder, at a preselected specific gravity, is maintained in a continuous flow. This continuous flow of unfermented soluble extract passes to a mixing zone where it mixes with a continuous flow of fermented fermentable extract taken from the outlet of a continuous fermenting plant in a volume ratio of 1 to 1 after passing through a yeast settling zone.

The mixture of unfermented soluble extract and the fermented fermentable extract passes to a pasteuriser consisting of a heating zone, a holding zone and a cooling zone. The mixture is heated to between 51° C. (124° F.) and 60° C. (140° F.) according to the degree and type of infective organisms in the mixture. It is then held at this temperature in the holding zone of the pasteuriser for up to 20 minutes before being cooled to a yeast fermentation temperature of about 15° C. (59° F.) The cooled mixture is then returned, all in a continuous flow, to the inlet of the continuous fermentation plant for fermentation and subsequent processing in a known manner.

The overall effect of the method of the present invention is to provide conditions of pasteurisation of fermentable and fermented extract at a low temperature. The low temperature pasteurisation is made possible by the mixing of unfermented fermentable extract with fermented fermentable extract. The presence of the products of fermentation and the resulting change in the pH in the mixture allows for lower temperatures to be used to achieve effective pasteurisation. The lower temperature pasteurisation process also provides for enhancement of both flavour and quality of the final alcoholic beverage.

It will be appreciated that embodiments of the present invention provide for the production of a soluble powdered extract of an unfermented fermentable extract from a processed disintegrated germinated grain mash and also a low temperature method of pasteurisation of a mixture of unfermented fermentable extract and fermented extract. The combined process of the production of a soluble powder and pasteurisation at low temperature provides a method for reducing levels of energy required for the production of alcoholic beverages and for improving the control of flavour qualities of alcoholic beverages.

Although this invention has been described by way of example and with reference to preferred embodiments it should be appreciated that modifications or improvements may be made thereto without departing from the scope or spirit of the invention as defined in the following claims.

What is claimed is:

1. A method for manufacturing an alcoholic beverage comprising, in the following succession, the steps of:
   (a) extracting a fermentable soluble extract in liquid form from a mash, said fermentable soluble extract comprising yeast nutrients;
   (b) pasteurizing said fermentable soluble extract by a process consisting essentially of the following steps in succession: (i) mixing said fermentable soluble extract with a fermented fermentable extract to form a mixture comprising said fermentable soluble extract and said fermented fermentable extract, (ii) heating the mixture in a heating zone to a temperature of between 51° C. and below 71° C., and (iii) holding said mixture for at least 10 minutes in a holding zone at said temperature;
   (c) cooling said mixture in a cooling zone to a temperature between 10° C. and 15° C.; and
   (d) fermenting the mixture with oxygenated brewer's yeast to produce said alcoholic beverage.

2. A method according to claim 1, wherein the fermented fermentable extract contains at least 4% alcohol by volume together with other products formed during fermentation, and is mixed with the fermentable soluble extract in a ratio of substantially 1 to 1.

3. A method according to claim 1, wherein the mixture is heated in step (b) (ii) to a temperature of between 51° C. and 60° C. and the mixture is held in said holding zone in step (b)(ii) for 10 to 20 minutes.

4. A method according to claim 1, wherein the mixture is cooled in the cooling zone to a temperature of 15° C. (59° F.).

5. A method according to claim 1, wherein the mixture, prior to said heating step (b)(ii), has an alcohol content of up to 5% of alcohol by volume together with other products formed during fermentation of the fermented fermentable extract.

6. A method according to claim 1, further comprising diluting said alcoholic beverage with carbonated oxygen-free brew water, and adding selected hop extract fractions and other flavoring compounds.

7. A method according to claim 1, further comprising the steps, prior to the pasteurizing the step, of:
   evaporating said fermentable soluble extract in liquid form within a vacuum vessel together with a spray dryer to evaporate the liquid to produce a fermentable soluble extract in powder form;
   dissolving said fermentable soluble extract in powder form with water to produce a dissolved powder product which constitutes the fermentable soluble extract that is mixed with the fermented fermentable extract in step (b)(i).

8. A method according to claim 7, wherein the temperature of the fermentable soluble extract in liquid form is kept below 71° C. (160° F.) during the evaporating step.

9. A method according to claim 7, wherein the temperature of the fermentable soluble extract in powder form is kept below 71° C. (160° F.) during the dissolving step.

10. A method according to claim 7, wherein the dissolving step is carried out using brew water.

11. A method according to claim 7, wherein said dissolved powder product has a specific gravity below 1.150 prior to the mixing in step (b)(i).

12. A method according to claim 7, wherein the fermented fermentable extract contains at least 4% alcohol by volume together with other products formed during fermentation, and is mixed with the fermentable soluble extract in step (b)(i) in a ratio of substantially 1 to 1.

13. A method according to claim 7, wherein the mixture is heated in step (b)(ii) to a temperature of between 51° C. and 60° C. and is held in the holding zone in step (b)(iii) at the temperature of between 51° C. and 60° C. for 10 to 20 minutes.

14. A method according to claim 7, wherein the mixture is cooled in the cooling zone to a temperature of 15° C. (59° F.).

15. A method according to claim 7, wherein the mixture, prior to said heating in step (b)(ii), has an alcohol content of up to 5% of alcohol by volume together with other products formed during fermentation of the fermented fermentable extract.

16. A method according to claim 7, further comprising, after the fermenting step, the steps of diluting said alcoholic beverage with carbonated oxygen-free brew water, and adding selected hop extract fractions and other flavoring components.

17. A method according to claim 7, further comprising, after the evaporating step, the step of packaging said fermentable soluble extract in powder form for storage or transportation or both, and wherein said dissolving step is carried out at a later time than or remote from said evaporating step.

18. A method according to claim 1, wherein the fermentable soluble extract provided in step (a) is formed from germinated grain that has been kept at temperatures below 82° C.

19. A method according to claim 7, wherein the fermentable soluble extract provided in step (a) is formed from germinated grain that has been kept at temperatures below 82° C.

20. A method for manufacturing an alcoholic beverage consisting essentially of the following steps in succession:
   (a) extracting a fermentable soluble extract in liquid form from a mash, said fermentable soluble extract comprising yeast nutrients;
   (b) evaporating said fermentable soluble extract in liquid form within a vacuum vessel together with a spray dryer to produce a fermentable soluble extract in powder form;
   (c) storing said powder extract until required or transferring it to another location, and holding said powder extract in a holding means to provide a continuous controlled flow of said powder extract;
   (d) dissolving said fermentable soluble extract in powder form with water to produce a dissolved powder product;
   (e) pasteurizing the dissolved powder product by a process consisting essentially of the following steps in succession;

(i) mixing the dissolved powder product with a fermented fermentable extract to form a mixture comprising the dissolved powder product and the fermented fermentable extract, (ii) heating the mixture in a heating zone to a temperature of between 51° C. and 60° C., and (iii) holding the heated mixture for 10 to 20 minutes in a holding zone at said temperature;

(f) cooling the mixture to a yeast fermenting temperature of between 10 and 15° C.; and (g) fermenting the mixture with oxygenated brewers yeast to produce the alcoholic beverage.

21. A method according to claim 20, wherein said selected specific gravity of said dissolved powder product is below substantially 1.150.

22. A method according to claim 20, wherein the fermentable soluble extract provided in step (a) is formed from germinated grain that has been kept at temperatures below 82° C.

\* \* \* \* \*